Nov. 8, 1960      H. B. BARRETT      2,959,150

METHODS AND APPARATUS FOR PREPARING BRAKE LINING

Filed March 8, 1957      4 Sheets-Sheet 1

INVENTOR
HARRY B. BARRETT

BY *Alfred W. Petchaft*

ATTORNEY

Nov. 8, 1960

H. B. BARRETT 2,959,150

METHODS AND APPARATUS FOR PREPARING BRAKE LINING

Filed March 8, 1957

INVENTOR
HARRY B. BARRETT

BY *Alfred W Petchaft*

ATTORNEY

Nov. 8, 1960 H. B. BARRETT 2,959,150
METHODS AND APPARATUS FOR PREPARING BRAKE LINING
Filed March 8, 1957 4 Sheets-Sheet 3

INVENTOR
HARRY B. BARRETT
BY Alfred W. Setchaft
ATTORNEY

Nov. 8, 1960  H. B. BARRETT  2,959,150
METHODS AND APPARATUS FOR PREPARING BRAKE LINING
Filed March 8, 1957  4 Sheets-Sheet 4

INVENTOR
HARRY B. BARRETT
BY
ATTORNEY

United States Patent Office 2,959,150
Patented Nov. 8, 1960

2,959,150

METHODS AND APPARATUS FOR PREPARING BRAKE LINING

Harry B. Barrett, Clayton, Mo.
(2101 Cass Ave., St. Louis 6, Mo.)

Filed Mar. 8, 1957, Ser. No. 644,833

12 Claims. (Cl. 118—211)

This invention relates in general to brake lining materials and, more particularly, to methods and apparatus for preparing brake lining.

Brake linings are ordinarily secured to automotive brake shoes by means of a thermosetting adhesive which is usually applied in liquid form to the inner face of the brake lining or the outer face of the brake shoe. The lining is pressed against the outer face of the brake shoe and clamped in place or otherwise subjected to mechanical pressure. The entire assembly is then subjected to heat, whereupon a strong bond is created between the lining and shoe. However, such conventional methods do not always result in satisfactory bond for the reason that the adhesive is not always applied uniformly and occasionally volatile components of the adhesive form gas pockets within the polymerizing adhesive film. Such gas pockets or gas bubbles, if not properly vented, will seriously weaken the bond.

Therefore, it is a primary object of the present invention to provide brake lining sections having a precisely predetermined amount of adhesive on the face of a brake lining which will give a maximum strength of bond.

It is also an object of the present invention to provide brake lining elements having a plurality of narrow bands of adhesive on the inner or bond-formed face thereof.

It is a further object of the present invention to provide a machine for applying a predetermined amount of adhesive to a brake lining.

It is an additional object of the present invention to provide a machine for applying a predetermined amount of adhesive to either a brake shoe or a brake lining.

It is another object of the present invention to provide a device of the type stated which is simple, durable, readily disassembled for cleaning without the use of hand tools, and can be operated by ordinarily skilled mechanics without special training or experience.

It is still another object of the present invention to provide a method of preparing either a brake shoe or a brake shoe lining which will afford a maximum strength of bond between the lining and the shoe.

With the above and other objects in view, my invention resides in the novel features of form, construction, arrangement, and combination of parts presently described and pointed out in the claims.

In the accompanying drawings (four sheets)—

Figure 1:
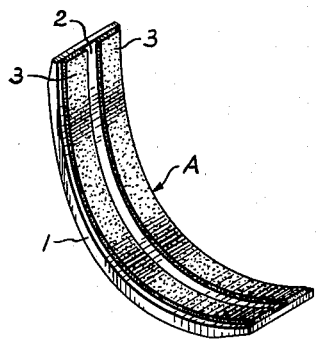
Fig. 1 is a perspective view of a brake lining element constructed in accordance with and embodying the present invention.

Referring now in more detail and by reference characters to the drawings, which illustrate practical embodiments of the present invention, A designates a brake lining element comprising a segment 1 of friction material having any suitable composition ordinarily employed in making brake linings. The rear or shoe-engaging face 2 is provided with a plurality of spaced parallel bands 3 of dry thermosetting adhesive, the bands 3 being of uniform thickness and width throughout their length. In this connection it should be pointed out that the chemical composition of the brake lining material and the thermosetting resin are not signficant in terms of the present invention. There are a number of brake lining compositions which are widely used by different manufacturers of such materials and, similarly, there are a number of available thermosetting adhesives used in the automotive brake field, most of which consist of thermosetting resins, plasticizers, and fillers. The present invention is not directly concerned with the formulation of these materials as such but, rather, to the completely novel and unique concept of preparing a brake lining element or section by applying thereto spaced bands of adhesive of predetermined or so-called "controlled" thickness and allowing the adhesive to dry thoroughly. The thickness, width, and length of the bands 3 of adhesive being precisely dimensioned makes it possible to provide just the right amount of adhesive for the particular shoe surface being covered. Of even greater importance is the fact that the spaces between the bands 3 allow for the escape of any gas which may be generated as the thermosetting adhesive initially softens under heat and then begins to polymerize or set up.

Figure 2:
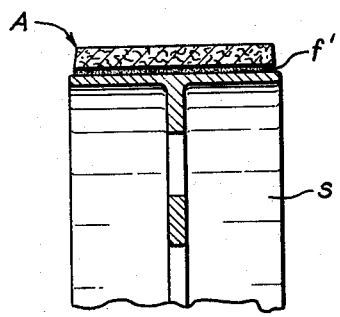
Fig. 2 is a fragmentary sectional view of a brake shoe with the brake shoe element of Fig. 1 bonded thereto.

The brake lining elements A are bonded to a brake shoe S by cleaning the face of the shoe thoroughly and then coating it with an activator which is allowed to dry. Thereupon the lining element A is positioned upon the shoe S with the adhesive bands 3 in tight contact with the activator-coated surface of the shoe S. The lining element A is then secured in such properly aligned position by means of a clamping device such as that shown in my United State Patent No. 2,646,836, and placed in a suitable heating oven for a prescribed period of time. The adhesive bands 3 will soften under the heat, spreading out evenly and smoothly to form a very thin bonding film $f'$ between the shoe S and the lining element A. Any film-interrupting gas bubbles will travel to the edges of the bands 3 and be expelled through the spaces therebetween as the adhesive softens and flows together, all accidentally formed gas bubbles being thus dissapated before the bands 3 finally merge into the complete bonding film $f'$, as best seen in Fig. 2.

In order to prepare the brake lining element A in the manner above described, an adhesive applicator B is provided which comprises a stand 4 preferably formed of sheet metal and provided with a horizontal top wall 5, a pair of downwardly diverging legs 6, 7, respectively terminating in flanges 8, 9, having a plurality of holes 10, 11, through which the stand 4 may be bolted to a work bench or other conventional supporting structure (not shown). Welded or otherwise rigidly secured to the horizontal top wall 5 is a shell-like housing $h$ preferably formed of sheet metal and having a bottom wall 12, vertically extending side walls 13, 14, and inwardly projecting opposed flanges 15, 16. The flanges 15, 16, are provided with elongated slots 17, 18, and a series of graduated markings 19, 20, all for purposes presently more fully appearing.

Rigidly positioned in and projecting through the side walls 13, 14, are axially aligned bushings 21, 22, which operatively support a shaft 23, provided on one end with a peripheral undercut portion 24 and a short lengthwise extending slot 25. The other end of the shaft is diametrically bored for snugly receiving a crank handle 26. A resilient wire pin 27 is riveted at one end 28 to the side wall 13 and at its other end is provided with a grip-forming eye 29. Intermediate its ends the pin 27 is adapted to engage the undercut portion 24 of the shaft 23, whereby said shaft 23 is restrained against axial movement. Mounted on and encircling the shaft 23 is a quill 30 provided on one end with a radially extending pin 31 press fitted therein which also extends into the slot 25 on the shaft 23 so that the quill 30 and shaft 23 will rotate in unison. Secured by a key 32 for rotation with, and lengthwise sliding adjustment along, the quill 30 is a pair of spaced parallel applicator rollers 33, 34, provided on their outer peripheries with narrow radially outwardly projecting, circumferentially extending flanges 35, 36, 37, 38, which define grooves 39, 40, of precisely predetermined depth. A segmental portion of the applicator rollers 33, 34, projects into a dip tank 41 which is filled with a thermosetting resinous adhesive f of the type previously discussed. It is preferable that the adhesive be one which is solid or a highly viscous fluid at room temperature and will dry to a firm solid after application. The adhesive, furthermore, should be capable of flowing freely at a temperature range of 350° F. to 400° F. and thereafter polymerizing or setting up when held at this temperature range for a predetermined interval. In other words, as the adhesive reaches the proper temperature, it first softens and flows under pressure. Then as it is held at this temperature range, it sets up and forms a strong irreversible bond.

The dip tank 41 rests upon the bottom wall 12 of the housing h and includes opposed side walls 42, 43, provided with semi-circular cut-outs 44, 45, for embracing the quill 30, and a front wall 46 having a flange 47 projecting laterally outwardly therefrom. Removably secured on the flange 47 by a fastening screw 48 is a wiper plate 49 having a mounting slot 50 through which the shank of the screw 48 passes, and a pair of spaced parallel guide slots 51, 52, provided with aligned back edges 53, 54. The slots 51, 52, are of a width very slightly larger than the width of the applicator rollers 33, 34, and the wiper plate 49 is secured to the flange 47 so that the applicator rollers 33, 34, are freely movable within the slots 51, 52, the outer peripheral edges of the flanges 35, 36, 37, 38, being just in contact with the back edges 53, 54, as best seen in Fig. 3.

Figure 7:
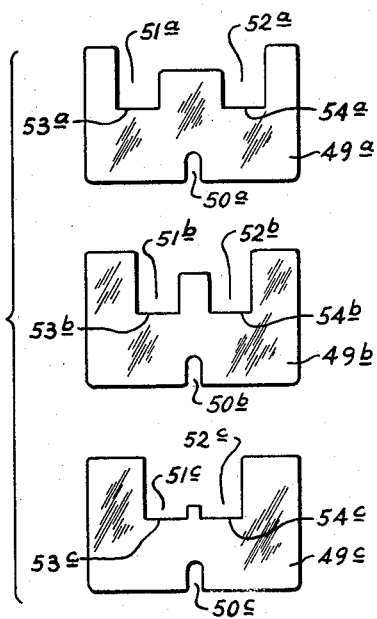
Fig. 7 is a plan view showing various wiper plates which may be selectively incorporated in the applicator.

It is to be noted that any one of several wiper plates shown in Fig. 7 may optionally be employed depending upon the width of the brake lining material to which the adhesive is to be applied. Thus, for example, Fig. 7 illustrates several wiper plates 49ª, 49ᵇ, 49ᶜ, similar in construction to wiper plate 49, and provided with mounting slots 50ª, 50ᵇ, 50ᶜ, guide slots 51ª, 52ª, 51ᵇ, 52ᵇ, 51ᶜ, 52ᶜ, and back edges 53ª, 54ª, 53ᵇ, 54ᵇ, 53ᶜ, 54ᶜ. However, the spacing of the guide slots varies among the wiper plates 49ª, 49ᵇ, 49ᶜ, so that when any selected guide plate is used, it will hold the applicator rollers 33, 34, in properly spaced relation.

Rigidly secured by nuts 55, 56, to the upper end of the side walls 13, 14, in downwardly spaced relation to the flanges 15, 16, is a shaft 57 for rotatably supporting a rubber-like feed roller 58 provided on its outer periphery with a plurality of circumferentially extending grooves 59. Adjustably secured to the flanges 15, 16, through the slots 17, 18, by means of fastening screws 60, 61, is a pair of opposed U-shaped guides 62, 63, provided on one leg with guide plates 64, 65, and on their bight portions with markings 66, 67, which are adapted to cooperate with markings 19, 20, on the flanges 15, 16, whereby the guide plates may be accurately spaced apart to guide various sizes of brake linings through the applicator.

Figure 3:
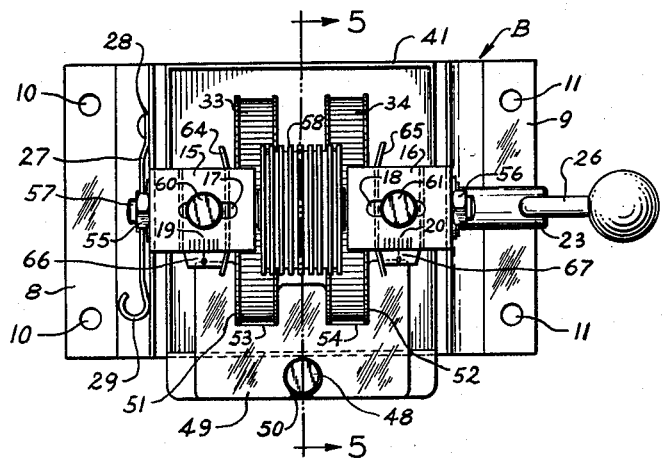
Fig. 3 is a top plan view of an adhesive applicator constructed in accordance with and embodying the present invention.
Figure 4:
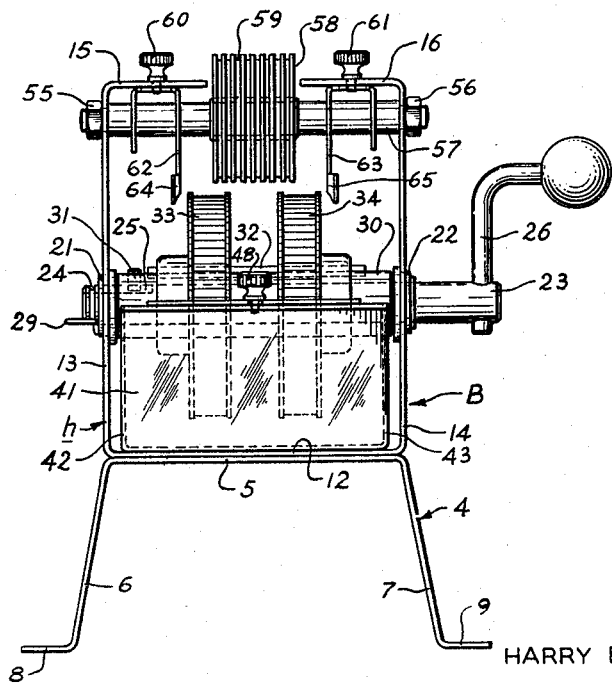
Fig. 4 is a side elevational view of the brake bonding adhesive applicator.
Figure 5:
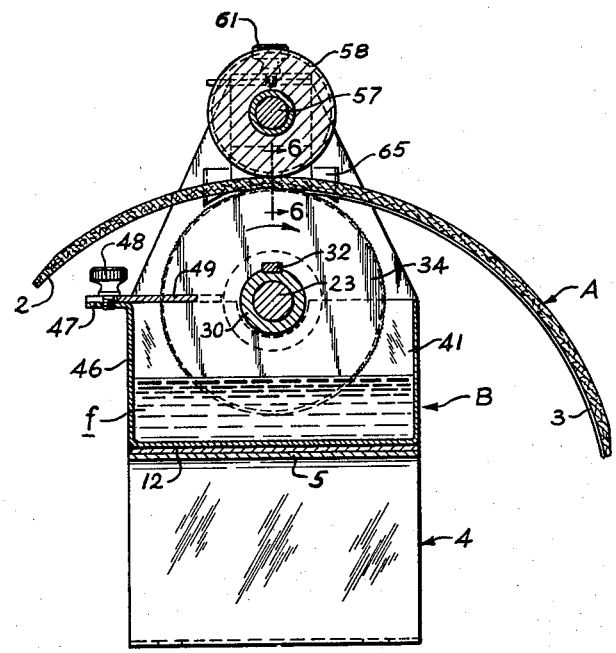
Fig. 5 is a sectional view taken along line 5—5 of Fig. 3.
Figure 6:
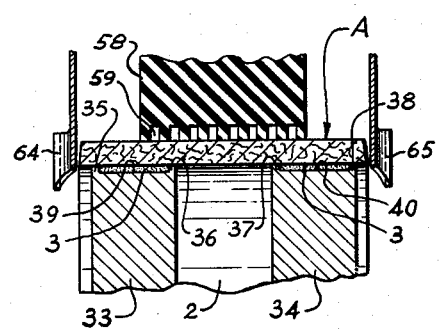
Fig. 6 is an enlarged fragmentary sectional view taken along line 6—6 of Fig. 5.

In use, the fastening screw 48 is removed and the proper size wiper plate is selected and mounted on the flange 47, as shown in Figs. 3 to 5, whereupon the screw 48 is threaded into place. The screws 60, 61, are then loosened and the guides 62, 63, are adjusted so that the guide plates 64, 65, are spaced the width of the arcuate piece of brake lining A, as best seen in Fig. 6. The edge of the brake lining A is then positioned between the applicator rollers 33, 34, and the rubber-like feed roller 58, and the handle 26 is manually cranked, whereupon the lining A is fed through the applicator. As the applicator rollers 33, 34, rotate, the liquid adhesive is picked up in the grooves 39, 40, and the excess adhesive on the flanges 35, 36, 37, 38, is removed by the wiper plate 49. Since the adhesive f is fairly viscous, it will be pulled out of the grooves 39, 40, as flanges 35, 36, 37, 38, contact the inside face of the brake lining element A, whereby a controlled width and thickness of thermosetting resinous adhesive in the form of two narrow, spaced parallel bands 3 is deposited along the entire length of the inside face of the lining element A.

Figure 8:
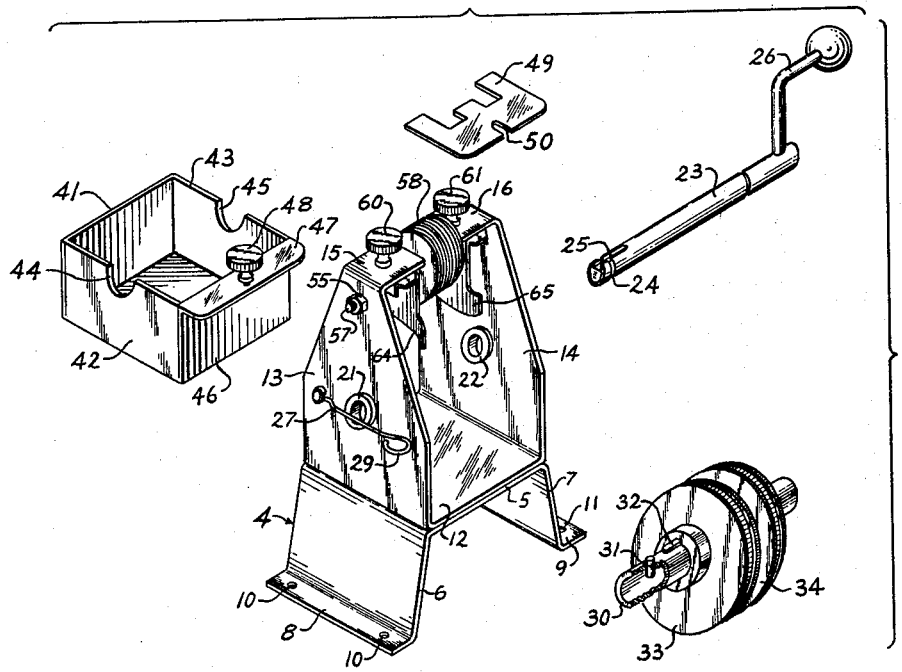
Fig. 8 is an exploded perspective view of the applicator showing the parts disassembled for cleaning.

The applicator B may be easily disassembled for cleaning or other maintenance as shown by Fig. 8. Thus, it is merely necessary to remove the wiper plate 49 and then depress the resilient wire pin 27, whereupon the shaft 23 may be axially withdrawn from the bushings 21, 22. The dip tank 41 and quill 30 may then be lifted out of the housing h and separated.

Figure 9:
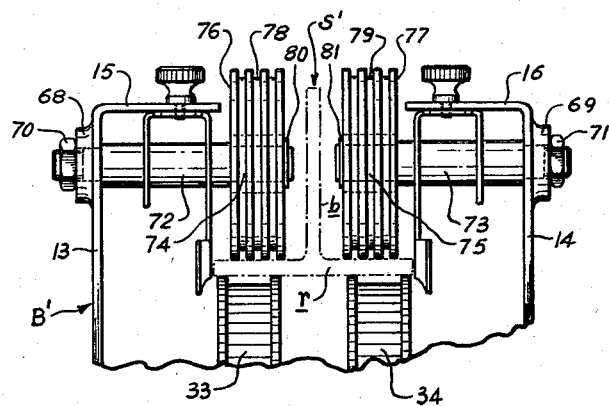
Fig. 9 is a side elevational view similar to Fig. 4 and showing a modified form of adhesive applicator.

It is also possible to provide a modified form of adhesive applicator B', shown in Fig. 9, which is similar in all respects to the applicator B, previously described, except that welded or otherwise rigidly secured to the upper end of the side walls 13, 14, and projecting outwardly therefrom in downwardly spaced relation to the flanges 15, 16, is a pair of aligned bosses 68, 69. Rigidly secured in the bosses 68, 69, by nuts 70, 71, is a pair of aligned shafts 72, 73, each provided with diametrally reduced inner end portions 74, 75, for rotatably supporting a pair of spaced, parallel, rubber-like feed-rollers 76, 77, of equal diameter which are, in turn, provided on their outer peripheries with circumferentially extending grooves 78, 79. The feed-rollers 76, 77, are held on the end portions 74, 75, by means of snap-on retaining rings 80, 81.

The applicator B' is used to apply adhesive to the inside face of the brake lining in the same manner as that of the applicator B, previously described. However, by use of the pair of spaced feed-rollers 76, 77, it is also possible to apply the two spaced parallel bands of adhesive to the outer face of the rim r of a brake shoe S', in which case, as the brake shoe S' is fed through the applicator B', the rim r is positioned between the applicator rollers 33, 34, and the feed-rollers 76, 77, and the brake shoe flange b is positioned in the space between the feed-rollers 76, 77.

It should be understood that changes and modifications in the form, construction, arrangement, and combination of the several parts of the methods and apparatus for preparing brake lining may be made and substituted for those herein shown and described without departing from the nature and principle of my invention.

Having thus described my invention, what I claim and desire to secure by Letters Patent is:

1. A brake lining adhesive applicator comprising a frame, a dip tank supported by said frame and adapted to hold a liquid adhesive, roller means for contacting the outer face of the brake lining, a shaft rotatably mounted in said frame, a tubular quill co-axially mounted on said shaft for rotation therewith, a plurality of applicator rollers mounted on said quill and each being freely slidable lengthwise along said quill, said roller means and applicator rollers cooperating to feed said lining along a predetermined path, said applicator rollers being adapted to project into said dip tank and apply a plurality of spaced layers of liquid adhesive to the back face of the lining as it is feed along said predetermined path, and a plate provided with a plurality of open-ended U-shaped slots having straight parallel side margins spaced apart by a distance substantially equal to the axial width of the applicator rollers and being adapted to fit embracingly around the outer peripheral portion of said rollers with said side margins in snug-fitting scraping contact with the lateral faces of said rollers whereby to establish the spacing between said rollers and operatively hold them in such spaced position during rotation while at the same time removing adhesive from the lateral faces of the rollers as they rotate through said slots.

2. A brake lining adhesive applicator comprising a frame, a dip tank supported by said frame and adapted to hold a liquid adhesive, roller means for contacting the outer face of the brake lining, a shaft rotatably mounted in said frame, a tubular quill co-axially mounted on said shaft for rotation therewith, a plurality of applicator rollers mounted on said quill and each being freely slidable lengthwise along said quill, said roller means and applicator rollers cooperating to feed said lining along a predetermined path, said applicator rollers being adapted to project into said dip tank and apply a plurality of spaced layers of liquid adhesive to the back face of the lining as it is fed along said predetermined path, and means provided with a plurality of open-ended U-shaped slots having straight parallel side margins spaced apart by a distance substantially equal to the axial width of the applicator rollers and being adapted to fit embracingly around the outer peripheral portion of said rollers with said side margins in snug-fitting scraping contact with the lateral faces of said rollers whereby to establish the spacing between said rollers and operatively hold them in such spaced position during rotation while at the same time removing adhesive from the lateral faces of the rollers as they rotate through said slots.

3. A brake lining adhesive applicator comprising a frame, a dip tank supported by said frame and adapted to hold a liquid adhesive, roller means for contacting the outer face of the brake lining, shaft means operatively mounted in said frame, a plurality of applicator rollers mounted on the shaft means and being freely slidable lengthwise along the shaft means, said roller means and applicator rollers co-operating to feed said lining along a predetermined path, said applicator rollers being adapted to project into said dip tank and apply a plurality of spaced layers of liquid adhesive to the back face of the lining as it is fed along said predetermined path, a plate removably secured to said dip tank and provided with a plurality of open-ended U-shaped slots having straight parallel side margins spaced apart by a distance substantially equal to the axial width of the applicator rollers and being adapted to fit embracingly around the outer peripheral portion of said rollers with said side margins in snug-fitting scraping contact with the lateral faces of said rollers whereby to establish the spacing between said rollers and operatively hold them in such spaced position during rotation while at the same time removing adhesive from the lateral faces of the rollers as they rotate through said slots, a pair of spaced adjustable guide plates secured to said frame for guiding said brake lining along said predetermined path, and means for adjusting the spacing between said guide plates.

4. A brake lining adhesive applicator comprising a frame having spaced side walls terminating at their upper ends in opposed inwardly projecting flanges, roller means for contacting the outer face of the brake lining, shaft means rotatably mounted in the side walls, a plurality of applicator rollers mounted on said shaft means and each being freely slidable lengthwise along the shaft means, a plate having a plurality of open-ended U-shaped slots having side margins spaced apart by a distance substantially equal to the axial width of the applicator rollers and being adapted to fit embracingly around a peripheral portion of said rollers with said side margins in snug-fitting sliding contact with the lateral faces of the roller whereby to establish the spacing between said rollers and operatively hold them in such spaced position during rotation, a pair of spaced guide plates mounted on said flanges and projecting from the flanges to the space between the roller means and the applicator rollers, and means for adjusting both of said guide plates toward and away from each other.

5. A brake lining adhesive applicator comprising a frame, a dip tank supported by the frame and adapted to hold a liquid adhesive, said dip tank being provided on two opposed walls with aligned arcuate cut-outs, shaft means rotatably mounted in said frame and adapted to project into said cut-outs so as to hold said dip tank substantially immovably on the frame, a plurality of applicator rolls mounted on said shaft means and each being freely slidable lengthwise along said shaft means, said applicator rollers projecting into said dip tank, roller means for contacting the outer face of the brake lining and means having a plurality of open-ended U-shaped slots having side margins spaced apart by a distance substantially equal to the axial width of the applicator rollers and being adapted to fit embracingly around a peripheral portion of said rollers with said side margins in snug-fitting sliding contact with the lateral faces of the rollers whereby to establish the spacing between said rollers and operatively hold them in such spaced position during rotation.

6. A brake lining adhesive applicator comprising a frame having opposed spaced walls, first and second roller means operatively mounted between said walls in spaced relation, said first and second roller means being aligned and having their axes of rotation substantially parallel, said roller means each including rollers being spaced for cooperative movement when a brake lining is inserted therebetween and also each including a shaft rotatably mounted in the frame, guide means including a pair of guide plates adjustably mounted on opposite sides of and in proximity to said first and second rollers whereby to confine the brake lining between the first and second roller means, driving means for rotating one of said rollers whereby through coaction with the brake lining the other roller means will be rotated and the lining will be urged through the applicator, and a dip tank mounted in proximity to the second roller means and containing a liquid adhesive, said dip tank being so located that as said second roller means is rotated by the driving means adhesive from the tank will collect on the second roller means and rotate therewith for transfer to the brake lining.

7. A brake lining adhesive applicator comprising a frame having opposed spaced walls, first and second roller means operatively mounted between said walls in spaced relation, said first and second roller means being aligned and having their axes of rotation substantially parallel, said roller means each including rollers being spaced for cooperative movement when a brake lining is inserted therebetween and also each including a shaft rotatably mounted in the frame, said walls each being provided with an inwardly extending flange above the first roller means, a U-shaped guide adjustably mounted on each of said flanges and extending from said flanges to the space separating the first and second rollers, a guide plate mounted on each of said guides and facewise presented to the space between the rollers in proximity to said rollers, driving means for rotating one of said rollers whereby through coaction with the brake lining the other roller means will be rotated and the lining will be urged through the applicator, and a dip tank mounted in proximity to the second roller means and containing a liquid adhesive, said dip tank being so located that as said second roller means is rotated by the driving means adhesive from the tank will collect on the second roller means and rotate therewith for transfer to the brake lining.

8. The applicator of claim 7 wherein the first roller means comprises a shaft, a plurality of first discs secured to said shaft, and a plurality of second discs secured to said shaft between adjacent first discs, said second discs being sized slightly smaller diametrally than said first discs, said first and second discs being secured in sidewise abutting relation whereby to define a first roller.

9. A brake lining adhesive applicator comprising a housing having a pair of opposed walls each provided at the upper margins with an inwardly projecting flange, a U-shaped bracket slidably mounted on each of said flanges and each provided with a pair of spaced downwardly projecting parallel sides, an upper shaft journaled between each U-shaped bracket and the complementary wall, said upper shafts being longitudinally sized for inward projection from the respective U-shaped bracket, an upper roller secured to each upper shaft, an elongated lower shaft journaled in and extending between the walls of said housing in vertically spaced relation from the upper shafts, a pair of applicator rollers secured to said lower shaft, a dip tank mounted on said housing and containing a liquid adhesive in contact with said applicator rollers, said upper shafts being separated by an amount sufficient to permit passage of the rim of a brake shoe when inserted between the rollers, and driving means for rotating said lower shaft whereby adhesive will be continually present on said applicator rollers and when a brake shoe is placed between said rollers the adhesive is transferred thereto in strips.

10. The applicator of claim 9 wherein guide means are mounted on the U-shaped brackets in outer proximity to the space between the upper and lower rollers for purposes of directing the passage of the brake shoe therebetween.

11. A brake lining adhesive applicator comprising a frame having opposed spaced walls, a pair of bearings operatively mounted in said walls in axis defining alignment, said bearings being substantially thicker than said walls and projecting inwardly therefrom, a dip tank having spaced opposed sides provided with arcuate cutouts sized for engagement with said bearings whereby said dip tank may be held snugly between said walls, a shaft journalled in said bearings and projecting outwardly from said frame, said shaft being provided with turning means and also having a longitudinally extending slot located near one end, a quill having a radially inwardly projecting member slidably mounted on the shaft, the member being sized and located within the slot in said shaft whereby to make the quill longitudinally slidable on said shaft and rotatable therewith, axially adjustable roller means mounted on said quill and each including a peripheral groove for applying adhesive from said dip tank onto a brake lining in contact with said roller means, and cooperating means operatively mounted on said frame for coating with said roller means when the latter is rotated by the turning means for urging the brake lining through the applicator.

12. The applicator of claim 11 wherein the shaft is retained in the bearing by means of a spring clip mounted on the frame and seated in an annular groove in the shaft whereby when the spring clip is moved from the groove the shaft may be slid out of the frame and the quill and applicator means are released for cleaning and storage.

References Cited in the file of this patent

UNITED STATES PATENTS

| | | |
|---|---|---|
| 941,530 | McKibbin | Nov. 30, 1909 |
| 1,112,134 | Hansing | Sept. 29, 1914 |
| 1,654,214 | Evans | Dec. 27, 1927 |
| 2,397,853 | Gist | Apr. 2, 1946 |
| 2,545,905 | Thomas | Mar. 20, 1951 |
| 2,573,052 | Parker | Oct. 30, 1951 |
| 2,590,339 | Minkow | Mar. 25, 1952 |
| 2,742,386 | Bigelow | Apr. 17, 1956 |
| 2,754,798 | Tilden | July 17, 1956 |
| 2,792,808 | Johns et al. | May 21, 1957 |